(12) United States Patent
Mehrotra et al.

(10) Patent No.: US 12,498,724 B2
(45) Date of Patent: Dec. 16, 2025

(54) SYSTEM AND METHOD FOR AUTONOMATED VEHICLE TRAVEL

(71) Applicant: Honda Motor Co., Ltd., Tokyo (JP)

(72) Inventors: Shashank Kumar Mehrotra, Campbell, CA (US); Zahra Zahedi, Tempe, AZ (US); Teruhisa Misu, San Jose, CA (US); Kumar Akash, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 18/371,753

(22) Filed: Sep. 22, 2023

(65) Prior Publication Data

US 2025/0103048 A1  Mar. 27, 2025

(51) Int. Cl.
*G05D 1/02* (2020.01)
*G05D 1/00* (2006.01)

(52) U.S. Cl.
CPC ......... *G05D 1/0221* (2013.01); *G05D 1/0214* (2013.01)

(58) Field of Classification Search
CPC ............................ G05D 1/0221; G05D 1/0214
See application file for complete search history.

(56) References Cited

U.S. PATENT DOCUMENTS

| | | | | |
|---|---|---|---|---|
| 2020/0406906 A1* | 12/2020 | Omari | ................ | G05D 1/0223 |
| 2021/0240190 A1* | 8/2021 | Wray | ................ | G06F 40/186 |
| 2021/0309253 A1* | 10/2021 | Verbeke | ................ | B60W 40/08 |
| 2025/0108837 A1* | 4/2025 | Kempf | ................ | B60W 10/18 |

FOREIGN PATENT DOCUMENTS

| | | | | |
|---|---|---|---|---|
| CN | 111447471 A | * | 7/2020 | ............. G06N 20/00 |
| CN | 113454645 A | * | 9/2021 | |

OTHER PUBLICATIONS

English translation of CN-111447471-A (Year: 2020).*
English translation of CN-113454645-A (Year: 2021).*
G. Angiello, "European cities and e-scooters at the crossroad," TeMAJournal of Land Use, Mobility and Environment, vol. 16, No. 1, pp. 233-237, 2023.

(Continued)

*Primary Examiner* — Navid Z. Mehdizadeh
*Assistant Examiner* — Matthew Ho
(74) *Attorney, Agent, or Firm* — Rankin, Hill & Clark LLP

(57) ABSTRACT

An automated vehicle (AV) is configured to perform automated travel, and includes vehicle sensors configured to detect a second vehicle in a surrounding environment of the AV. The AV includes at least one of a brake mechanism, an accelerator mechanism, a steering control, and a user interface configured to generate a user response to automated travel by the AV. The AV includes a computing device configured to identify an interaction between the AV and the second vehicle while executing an automated travel path, and receive user responses to automated travel by the AV. The computing device is configured to determine at least one aspect of wellbeing, trust, and satisfaction of the user riding the AV based on the user responses, and determine a learned optimal policy which increases the at least one aspect of wellbeing, trust, and satisfaction based on the user responses.

19 Claims, 11 Drawing Sheets

(56) References Cited

OTHER PUBLICATIONS

E. Angner, "Subjective well-being," The Journal of Socio-Economics, vol. 39, No. 3, pp. 361-368, Jun. 2010. [Online]. Available: https://linkinghub.elsevier.com/retrieve/pii/S1053535709001590.

R. Dodge, A. Daly, J. Huyton, and L. Sanders, "The challenge of defining wellbeing," International Journal of Wellbeing, vol. 2, No. 3, pp. 222-235, Aug. 2012. [Online]. Available: http://www.internationaljournalofwellbeing.org/index.php/ijow/article/view/89/238.

J. Dorrian, J. Chapman, L. Bowditch, N. Balfe, and A. Naweed, "A survey of train driver schedules, sleep, wellbeing, and driving performance in australia and new zealand," Scientific Reports, vol. 12, No. 1, p. 3956, 2022.

M. Friman, S. Fujii, D. Ettema, T. Garling, and L. E. Olsson, "Psychometric analysis of the satisfaction with travel scale," Transportation Research Part A: Policy and Practice, vol. 48, pp. 132-145, 2013.

E. Games, "I. unreal engine." [Online]. Available: https://www.unrealengine.com/.

M. Gerla, E.-K. Lee, G. Pau, and U. Lee, "Internet of vehicles: From intelligent grid to autonomous cars and vehicular clouds," in 2014 IEEE world forum on internet of things (WF-IoT). IEEE, 2014, pp. 241-246.

B. Greiner and M. V. Levati, "Indirect reciprocity in cyclical networks: An experimental study," Journal of Economic Psychology, vol. 26, No. 5, pp. 711-731, 2005.

J. L. Huang, N. A. Bowling, M. Liu, and Y. Li, "Detecting insufficient effort responding with an infrequency scale: Evaluating validity and participant reactions," Journal of Business and Psychology, vol. 30, pp. 299-311, 2015.

Jacob G. Hunter, Elise Ulwelling, Matthew Konishi, Noah Michelini, Akhil Modali, Anne Mendoza, Jessie Snyder, Shashank Mehrotra, Zhaobo Zheng, Anil R. Kumar, Kumar Akash, Teruhisa Misu, Neera Jain and Tahira Reid, "The future of mobility-as-a-service: trust transfer across automated mobilities, from road to sidewalk" Front. Psychol., May 12, 2023, Sec. Human-Media Interaction, vol. 14—2023 https://doi.org/10.3389/fpsyg.2023.1129583.

C. C. Jorge and R. J. Rossetti, "On social interactions and the emergence of autonomous vehicles." in VEHITS, 2018, pp. 423-430.

S. Jorlöv, K. Bohman, and A. Larsson, "Seating positions and activities in highly automated cars—a qualitative study of future automated driving scenarios," in International research conference on the biomechanics of impact. IRCOBI, 2017, pp. 13-22.

A. Kuznetsova, P. B. Brockhoff, R. H. B. Christensen et al., "Package 'Imertest'," R package version, vol. 2, No. 0, p. 734, 2015.

K. Le Goff, A. Rey, P. Haggard, O. Oullier, and B. Berberian, "Agency modulates interactions with automation technologies," Ergonomics, vol. 61, No. 9, pp. 1282-1297, 2018.

R. Madigan, S. Nordhoff, C. Fox, R. E. Amini, T. Louw, M. Wilbrink, A. Schieben, and N. Merat, "Understanding interactions between automated road transport systems and other road users: A video analysis," Transportation research part F: traffic psychology and behaviour, vol. 66, pp. 196-213, 2019.

K. Mahadevan, E. Sanoubari, S. Somanath, J. E. Young, and E. Sharlin, "Av-pedestrian interaction design using a pedestrian mixed traffic simulator," in Proceedings of the 2019 on designing interactive systems conference, 2019, pp. 475-486.

Shashank Mehrotra, Jacob G Hunter, Matthew Konishi, Kumar Akash, Zhaobo Zheng, Teruhisa Misu, Anil Kumar, Tahira Reid, Neera Jain, "Trust in Shared Automated Vehicles: Study on Two Mobility Platforms" arXiv:2303.09711v1, Mar. 17, 2023. https://doi.org/10.48550/arXiv.2303.09711.

J. Moody, N. Bailey, and J. Zhao, "Public perceptions of autonomous vehicle safety: An international comparison," Safety science, vol. 121, pp. 634-650, 2020.

M. Nigro, M. Castiglione, F. M. Colasanti, R. De Vincentis, C. Liberto, G. Valenti, and A. Comi, "Investigating potential electric micromobility demand in the city of rome, italy," Transportation Research Procedia, vol. 62, pp. 401-407, 2022.

T. Nouvian, "In paris referendum, 89% of voters back a ban on electric scooters," Apr. 2023. [Online]. Available: https://www.nytimes.com/2023/04/03/world/europe/paris-electric-scooters-ban.html.

Qualtrics, "Using Attention Checks in Your Surveys May Harm Data Quality—qualtrics.com," https://www.qualtrics.com/blog/attention-checks-and-data-quality/, [Accessed May 11, 2023].

J. Radzyk, "Validation of a new social well-being questionnaire," B.S. thesis, University of Twente, 2014.

Z. Sajedinia, K. Akash, Z. Zheng, T. Misu, M. Dong, V. Krishnamoorthy, K. Martinez, K. Sureshbabu, and G. Huang, "Investigating users' preferences in adaptive driving styles for level 2 driving automation," in Proceedings of the 14th International Conference on Automotive User Interfaces and Interactive Vehicular Applications, 2022, pp. 162-170.

S. Shah, D. Dey, C. Lovett, and A. Kapoor, "Airsim: High-fidelity visual and physical simulation for autonomous vehicles," in Field and Service Robotics: Results of the 11th International Conference. Springer, 2018, pp. 621-635.

H. Silber, J. Roßmann, and T. Gummer, "The issue of noncompliance in attention check questions: False positives in instructed response items," Field Methods, vol. 34, No. 4, pp. 346-360, 2022.

A. Stocker and S. Shaheen, "Shared automated vehicles: Review of business models," Paris, International Transport Forum Discussion Paper Sep. 2017, 2017. [Online]. Available: http://hdl.handle.net/10419/194044.

X. Sun, S. Cao, and P. Tang, "Shaping driver-vehicle interaction in autonomous vehicles: How the new in-vehicle systems match the human needs," Applied ergonomics, vol. 90, p. 103238, 2021.

D. A. Vella-Brodrick and J. Stanley, "The significance of transport mobility in predicting well-being," Transport Policy, vol. 29, pp. 236-242, 2013.

C. Welzel and R. Inglehart, "Agency, values, and well-being: A human development model," Social indicators research, vol. 97, No. 1, pp. 43-63, 2010.

Zhang, F., Mehrotra, S., & Roberts, S. C. "Driving distracted with friends: Effect of passengers and driver distraction on young drivers' behavior," Accident Analysis and Prevention, 132, Article 105246, (2019).

* cited by examiner

Scenerio: S1

Scenerio: S2

Estimates from regression analysis. Only estimates with p-value < 0.05 have been reported. *p < 0.05; p < 0.01; *p < 0.001

| Dependent Variable | Independent Variable | Estimate | Std. Error | t-value | p-value |
|---|---|---|---|---|---|
| Wellbeing interaction 1 | Robot yielding | 0.2934 | 0.1479 | 1.984 | 0.0482* |
| | Brake frequency: Interaction 1 | -0.0950 | 0.0304 | -3.129 | 0.0018** |
| | Social interaction perception: Ego wellbeing | 0.4488 | 0.0707 | 6.344 | < 0.0001*** |
| | Scenario: S2 → S1 | 0.3418 | 0.1013 | 3.375 | 0.0008*** |
| Wellbeing interaction 2 | Social interaction perception: Ego wellbeing | 0.4553 | 0.0715 | 6.365 | < 0.0001*** |
| Satisfaction (positive activation) interaction 1 | Robot yielding | 0.3737 | 0.1149 | 3.254 | 0.0013** |
| | Brake frequency: Interaction 1 | -0.0510 | 0.0236 | -2.160 | 0.0312* |
| | Social interaction perception: Ego wellbeing | 0.1089 | 0.0549 | 1.983 | 0.0484* |
| | Scenario: S1 → S4 | 0.4690 | 0.1282 | 3.658 | 0.0003*** |
| | Scenario: S2 → S1 | 0.6573 | 0.0788 | 8.340 | < 0.0001*** |
| | Scenario: S3 → S2 | 0.4052 | 0.1269 | 3.192 | 0.0015** |
| Satisfaction (positive activation) interaction 2 | Robot yielding | 0.3665 | 0.1154 | 3.176 | 0.0017** |
| | Scenario: S1 → S4 | 0.4192 | 0.1264 | 3.320 | 0.0010** |
| | Scenario: S2 → S1 | 0.6771 | 0.0805 | 8.413 | < 0.0001*** |
| | Scenario: S3 → S2 | 0.4144 | 0.1276 | 3.247 | 0.0013** |
| Trust (in others) interaction 1 | Robot yielding | 0.5802 | 0.1706 | 3.401 | 0.0008*** |
| | Brake frequency: Interaction 1 | -0.0964 | 0.0389 | -2.470 | 0.0138* |
| | Social interaction perception: Ego wellbeing | 0.3209 | 0.0814 | 3.945 | 0.0001*** |
| | AV scooter yielding Alignment | -0.2429 | 0.1138 | -2.133 | 0.0334* |
| | | 0.2950 | 0.1135 | 2.599 | 0.0096** |
| | Scenario: S1 → S4 | -0.4357 | 0.1918 | -2.271 | 0.0236* |
| | Social interaction perception: Positive relation | 0.2224 | 0.0932 | 2.385 | 0.0177* |
| | Social interaction perception: Ego wellbeing | 0.1984 | 0.0733 | 2.707 | 0.0072** |
| | Scenario: S2 → S1 | 0.6539 | 0.1107 | 5.907 | < 0.0001*** |
| Trust (in scooter) interaction 2 | Brake frequency: Interaction 1 | -0.1137 | 0.0373 | -3.052 | 0.0024** |
| | Social interaction perception: Ego wellbeing | 0.2169 | 0.0807 | 2.688 | 0.0076** |
| | AV scooter yielding | 0.7437 | 0.1083 | 6.864 | < 0.0001*** |
| | Scenario: S3 → S2 | -0.1869 | 0.08270 | -2.260 | 0.0244* |

FIG. 7

Average 5-fold cross-validation performance of the models with 95% CI.

|       | Accuracy        | F1-score        | AUC-ROC         |
|-------|-----------------|-----------------|-----------------|
| SVC   | 69.47% ± 0.06%  | 0.7781 ± 0.0005 | 0.7136 ± 0.0006 |
| LR    | 65.86% ± 0.05%  | 0.7539 ± 0.0004 | 0.6866 ± 0.0004 |
| RF    | 62.52% ± 0.08%  | 0.7121 ± 0.0007 | 0.6275 ± 0.0008 |
| AdaBoost | 64.73% ± 0.07% | 0.7345 ± 0.0005 | 0.6840 ± 0.0006 |

SYSTEM AND METHOD FOR AUTONOMATED VEHICLE TRAVEL

BACKGROUND

Recent advances in automated vehicle (AV) technology and micromobility devices promise a transformational change in the future of mobility usage. These advances also pose challenges concerning human-autonomous vehicle interactions, which benefit from seamless interactions between road users. One approach to ensure smooth adoption of these new mobilities includes assessing how past experiences and perceptions of social interactions by users may impact the interactions with their own AV mobility.

Recent innovations in mobility on developing autonomous vehicles and delivery robots hold promise not only toward safety but also toward comfortable and satisfactory mobility interactions. With advances in the convergence between AV technology and shared mobility, there have been civic planning and engagement efforts to consider demands at a societal level of such mobilities. However, adoption of these technologies would require societal acceptance as these technologies may potentially change traffic interactions between humans and AV technology.

More specifically, there is demand for AVs to coexist with existing road users, however, there have been several societal challenges toward this smooth transition. For example, voter bans on electric scooters. One of the primary reasons for the critique of such public sentiment is the perception of disregard towards public space and potential conflicts with other road users. As such, there is demand for mechanisms which increase human acceptance and satisfaction while interacting with road actors in a mixed traffic environment featuring AV and human directed transport.

When studying these types of interactions, researchers have focused on the safety and comfort of road users. As noted, however, a roadblock to the adoption of AV technology has been the challenge with the public perception of its capabilities and how that would impact other road users. To facilitate adoption of AV technology, there is a desire for AV technology capable of interacting with road users based on impact toward an aspect of wellbeing, trust, and travel satisfaction of the users.

Notably, amongst world institutions, wellbeing has been considered a potential proxy measure to define the state of an individual. Wellbeing could be defined as when individuals have the psychological, social and physical resources to meet challenges related to those resources. Studies have found better wellbeing to be associated with greater satisfaction with transportation mobility used for commuting by survey participants. Also, systematic review on factors underpinning unsafe traffic behavior showed higher levels of wellbeing may help mitigate potential driving-related violations. In this regard, user trust in the AV and satisfaction with the interaction may be factors that impact users' adoption of new mobilities, in addition to wellbeing.

BRIEF DESCRIPTION

According to one aspect, an AV is configured to perform automated travel. The AV includes vehicle sensors configured to detect a second vehicle in a surrounding environment of the AV. The AV also includes at least one of a brake mechanism, an accelerator mechanism, a steering control, and a user interface configured to generate a user response to automated travel by the AV. The AV also includes a computing device configured to generate and execute an automated travel path based on a travel model, identify an interaction between the AV and the second vehicle in the surrounding environment of the AV while executing the automated travel path, and receive user responses to automated travel by the AV associated with the interaction with the second vehicle. The computing device is also configured to determine at least one aspect of wellbeing, trust, and satisfaction of the user riding the AV based on the user responses, and determine a learned optimal policy for automated travel by the AV which increases the at least one aspect of wellbeing, trust, and satisfaction of the user based on the user responses. The computing device is also configured to update the travel model based on the learned optimal policy, where the computing device generates and executes the automated travel path based on the travel model as the travel model is updated.

According to another aspect, a computer-implemented method for providing automated travel with an AV includes generating and executing an automated travel path of the AV based on a travel model, identifying an interaction between the AV and a second vehicle while executing the automated travel path, and receiving user responses to automated travel by the AV associated with the interaction with the second vehicle. The user responses are generated by at least one of a brake mechanism, an accelerator mechanism, a steering control, and a user interface included in the AV. The method also includes determining at least one aspect of wellbeing, trust, and satisfaction of the user riding the AV based on the user responses. The method also includes determining a learned optimal policy for automated travel by the AV which increases the at least one aspect of wellbeing, trust, and satisfaction of the user based on the user responses. The method also includes updating the travel model based on the learned optimal policy, where the computing device generates and executes the automated travel path based on the travel model as the travel model is updated.

According to another aspect, a non-transitory computer readable storage medium stores instructions that, when executed by a computer having a processor, causes the processor to perform a method. The method includes generating and executing an automated travel path of an AV based on a travel model, identifying an interaction between the AV and a second vehicle while executing the automated travel path, and receiving user responses to automated travel by the AV associated with the interaction with the second vehicle. The user responses are generated by at least one of a brake mechanism, an accelerator mechanism, a steering control, and a user interface included in the AV. The method also includes determining at least one aspect of wellbeing, trust, and satisfaction of the user riding the AV based on the user responses. The method also includes determining a learned optimal policy for automated travel by the AV which increases the at least one aspect of wellbeing, trust, and satisfaction of the user based on the user responses. The method also includes updating the travel model based on the learned optimal policy, where the computing device generates and executes the automated travel path based on the travel model as the travel model is updated.

BRIEF DESCRIPTION OF THE DRAWINGS

FIG. 7 is a table of estimates produced from regression analysis performed for a plurality of series of two scenarios.

DETAILED DESCRIPTION

Figure 1:
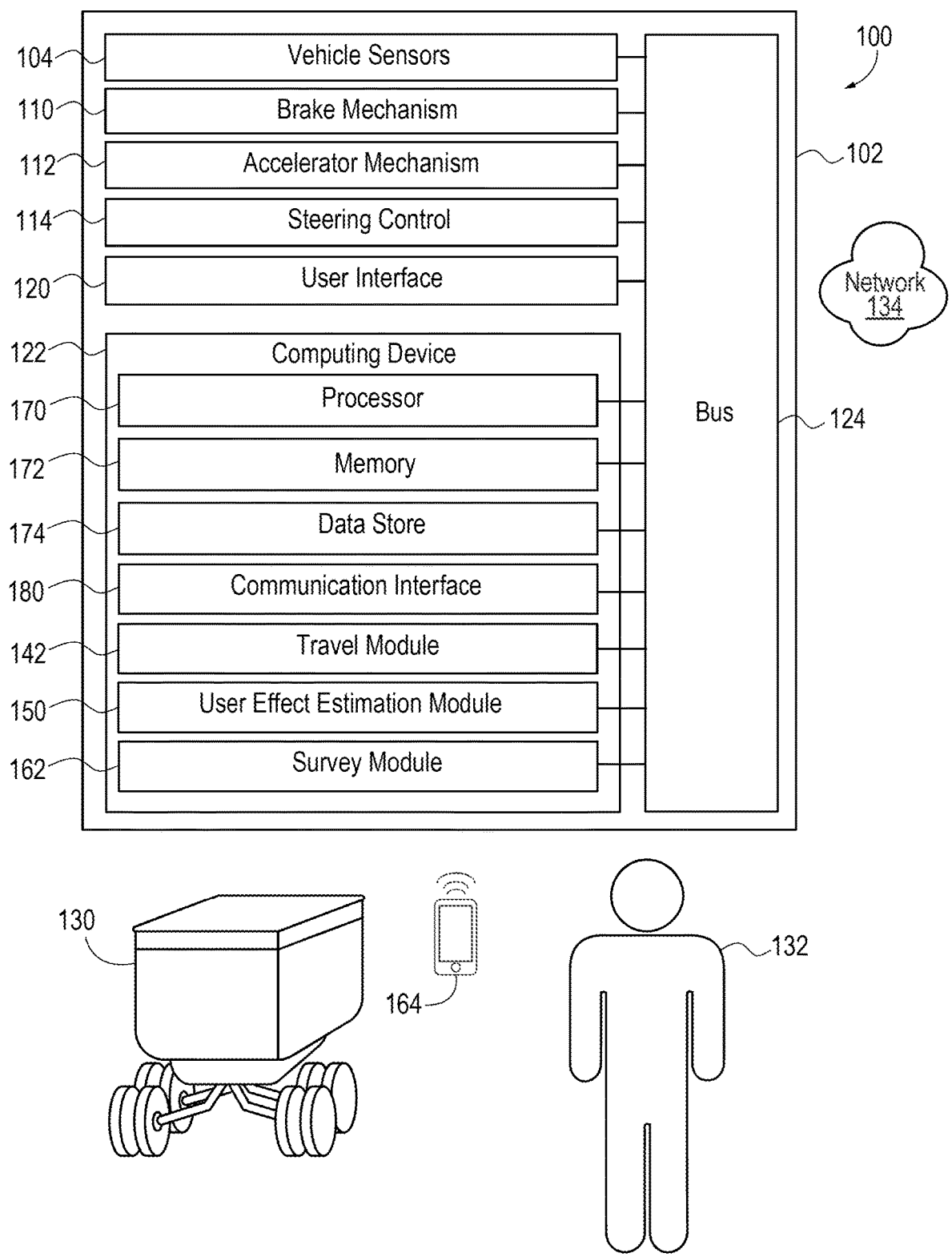
FIG. 1 is an exemplary operating environment of a system for adjusting automated travel by an AV.

The systems and methods disclosed herein are configured to identify and estimate a wellbeing of a user riding an AV based on user actions, prior experiences, social interaction perceptions, and symmetric action with other road users. A machine learning model is configured to predict a change in the wellbeing of the user, where an optimal policy based on the model allows informed AV actions toward yielding behavior with other road users to enhance users' wellbeing. The present disclosure also features broader implications for creating human-aware systems by creating policies that align with an individual state of wellbeing and contribute toward systems that align with the individual state of wellbeing.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Mobile device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

A "wearable computing device," as used herein may include, but is not limited to, a computing device component (e.g., a processor) with circuitry that may be worn or attached to user. In other words, a wearable computing device is a computer that is subsumed into the personal space of a user. Wearable computing devices may include a display and may include various sensors for sensing and determining various parameters of a user. For example, location, motion, and physiological parameters, among others. Exemplary wearable computing devices may include, but are not limited to, watches, glasses, clothing, gloves, hats, shirts, jewelry, rings, earrings necklaces, armbands, leashes, collars, shoes, earbuds, headphones and personal wellness devices.

System Overview

Referring now to the drawings, the drawings are for purposes of illustrating one or more exemplary embodiments and not for purposes of limiting the same. FIG. 1 is an exemplary component diagram of an operating environment 100 of an automated vehicle (AV) 102 including vehicle sensors 104, a brake mechanism 110, an accelerator mechanism 112, a steering control 114, a user interface 120, and a computing device 122.

Each of the vehicle sensors 104, the brake mechanism 110, the accelerator mechanism 112, the steering control 114, the user interface 120, and the computing device 122 may be interconnected by a bus 124. The components of the operating environment 100, as well as the components of other systems, hardware architectures, and software architectures discussed herein, may be combined, omitted, or organized into different architectures for various embodiments.

The vehicle sensors 104 are configured for detecting objects including other vehicles, for example a second vehicle 130, and pedestrians in a surrounding environment of the AV 102, and configured for sending corresponding sensor data to the computing device 122 for monitoring interactions between the AV 102 and detected objects. The user interface 120 is configured for detecting movements and expressions of a user 132 riding the AV 102, where the movements and expressions indicate at least one of a gesture associated with adjusting automated travel by the AV 102, a response to a survey question provided by the AV 102, and an aspect of wellbeing, trust, or travel satisfaction of the user 132 riding the AV 102. The vehicle sensors 104 and the user interface 120 may include optical, infrared, or other cameras, light detection and ranging (LiDAR) systems, position sensors, proximity sensors, and a variety of other sensors and sensor combinations similar to those found in known vehicles for facilitating autonomous travel and monitoring user behavior, and therefore will not be described in detail.

The computing device 122 may be implemented as a part of the AV 102 or another device, e.g., a remote server (not shown), connected via a network 134. The computing device 122 may be capable of providing wired or wireless computer communications utilizing various protocols to send and receive electronic signals internally to and from components of the operating environment 100. Additionally, the computing device 122 may be operably connected for internal computer communication via the bus 124 (e.g., a Controller Area Network (CAN) or a Local Interconnect Network (LIN) protocol bus) to facilitate data input and output between the computing device 122 and the components of the operating environment 100.

The AV 102 is configured to identify and estimate a wellbeing of the user 132 associated with types of actions the user 132, and determine how the user 132 wants the AV 102 to interact with, for example, sidewalk users and road users such as the second vehicle 130. In this regard, the AV 102 is configured to elicit a user response from the user 132 when the user 132 encounters a dyadic bi-directional interaction featuring path symmetry between the AV 102 and the second vehicle 130. More specifically, the AV 102 is configured to determine accommodative actions including yielding and unyielding actions made by the user 132 in an interaction featuring conflict between travel paths of the AV 102 and the second vehicle 130.

Figure 2:
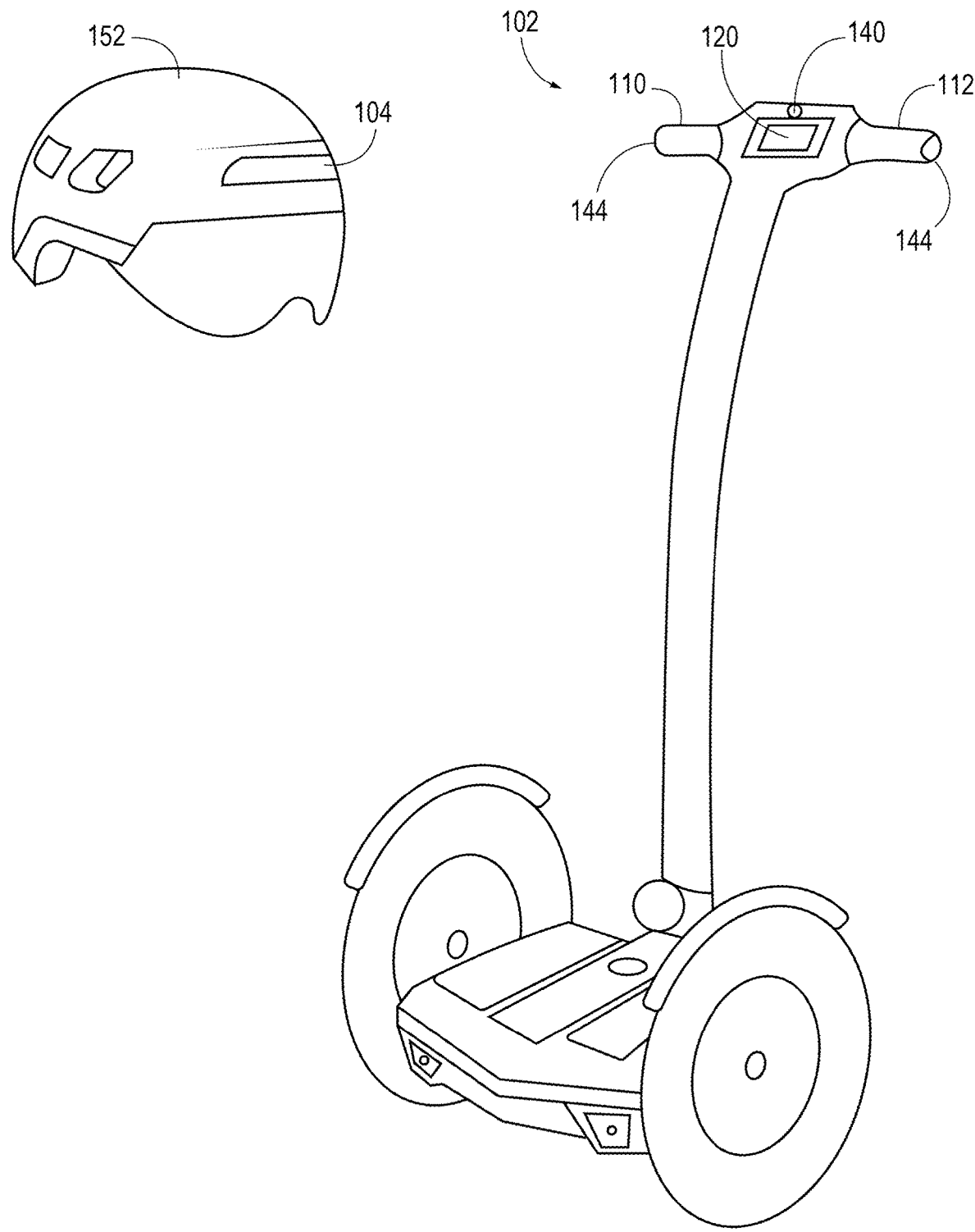
FIG. 2 is a perspective view of the AV.

With reference to FIG. 2, the AV 102 is configured to receive user responses generated as real-time feedback to automated travel performed by the AV 102, where the user 132 indicates a desire for deviating from an automated travel path generated and executed by the AV 102. Such a response from the user 132 may include actuating the brake mechanism 110 to indicate a desire for delaying the AV 102 from the automated travel path. In this regard, the AV 102 may record a frequency value indicating a number of times the brake mechanism 110 is actuated during an interaction with the second vehicle 130, and an intensity value indicating a longest continuous actuation of the brake mechanism 110 during the interaction to account for the desired braking behavior of the user 132.

Such a response may additionally or alternatively include the user 132 actuating the accelerator mechanism 112 to indicate a desire for accelerating the AV 102 beyond the automated travel path. Such a response may additionally or alternatively include a gesture made by the user 132 and detected by a camera 140 included in the user interface 120, where the gesture indicates a desire for at least one of braking and accelerating the AV 102, and deviating the AV 102 from the automated travel path. Such a response may additionally or alternatively include the user 132 actuating the steering control 114 to indicate a desire for steering the AV 102 from the automated travel path. Such a response may additionally or alternatively include the user 132 interacting with the user interface 120 to indicate a desire for at least one of braking and accelerating the AV 102, and deviating the AV 102 from the automated travel path.

Each of the vehicle sensors 104, the brake mechanism 110, the accelerator mechanism 112, the steering control 114, and the user interface 120 are operably connected with the computing device 122 to send data indicating generated user responses to the computing device 122 in real-time. The computing device 122 includes a travel module 142 configured to generate the automated travel path as the user 132 rides the AV 102. The travel module 142 stores and continually updates a dynamic travel model in real-time based on received user responses as the user 132 rides the AV 102, and generates the autonomous travel path based on a current condition of the dynamic travel model.

While, as depicted in FIG. 2, the AV 102 is an electric scooter with the brake mechanism 110, the accelerator mechanism 112, and the steering control 114 provided on handles 144 thereof, the AV 102 may alternatively be a variety of vehicles similarly capable of performing automated travel and recording user responses without departing from the scope of the present disclosure. In this regard, for example, the AV 102 may alternatively be a car, where the brake mechanism 110 includes a brake pedal, the accelerator mechanism 112 includes an accelerator pedal, the steering control 114 includes a steering wheel, and the user interface 120 forms a portion of a dashboard or control panel in the car without departing from the scope of the present disclosure.

Referring back to FIG. 1, the computing device 122 is configured to determine a tendency of accommodation by the user 132 toward the second vehicle 130 when there is conflict between the travel paths of the AV 102 and the second vehicle 130, based on user responses to the automated travel and a corresponding scenario type indicating circumstances of an interaction between the AV 102 and the second vehicle 130. Interactions between the AV 102 and the second vehicle 130 that may not be rule-driven, such as various dyadic bi-directional interactions featuring path symmetry, may be processed by the computing device 122 to determine the tendency of accommodation by the user 132 with respect to the second vehicle 130.

In this regard, the computing device 122 includes a user effect estimation module 150 configured to determine a change in a wellbeing, trust, and travel satisfaction of the user 132 based on interactions with the second vehicle 130. The user effect estimation module 150 is also configured to determine a change in a wellbeing, trust, and travel satisfaction of the user 132 based on a general state of the user 132 determined according to the user responses, and the answers to survey questions the user 132 provides to the AV 102. The user effect estimation module 150 processes the user responses and the answers to survey questions through a linear mixed effects model to compute the change in the wellbeing, the trust, and the travel satisfaction of the user 132 with respect to the AV 102 based on interactions with the second vehicle 130 and the determined general state of the user.

The vehicle sensors 104 include a front-facing camera mounted on the AV 102. The front-facing camera is configured for detecting the second vehicle 130 for various interactions in the surrounding environment of the AV 102, in front of the AV 102. With reference to FIG. 2, a helmet 152 that may be associated with the AV 102 also includes the vehicle sensors 104 mounted thereon.

FIGS. 3-6 each respectively depict a scenario S1, S2, S3, S4 featuring an exemplary dyadic bi-directional interaction between the AV 102 and the second vehicle 130. As depicted, the AV 102 is initially caused to follow a first automated travel path 154 and the second vehicle 130 is initially caused to follow a second automated travel path 160 where the AV 102 and the second vehicle 130 are bound to collide unless at least one of the AV 102 and the second vehicle 130 takes a yielding action.

Figure 3:
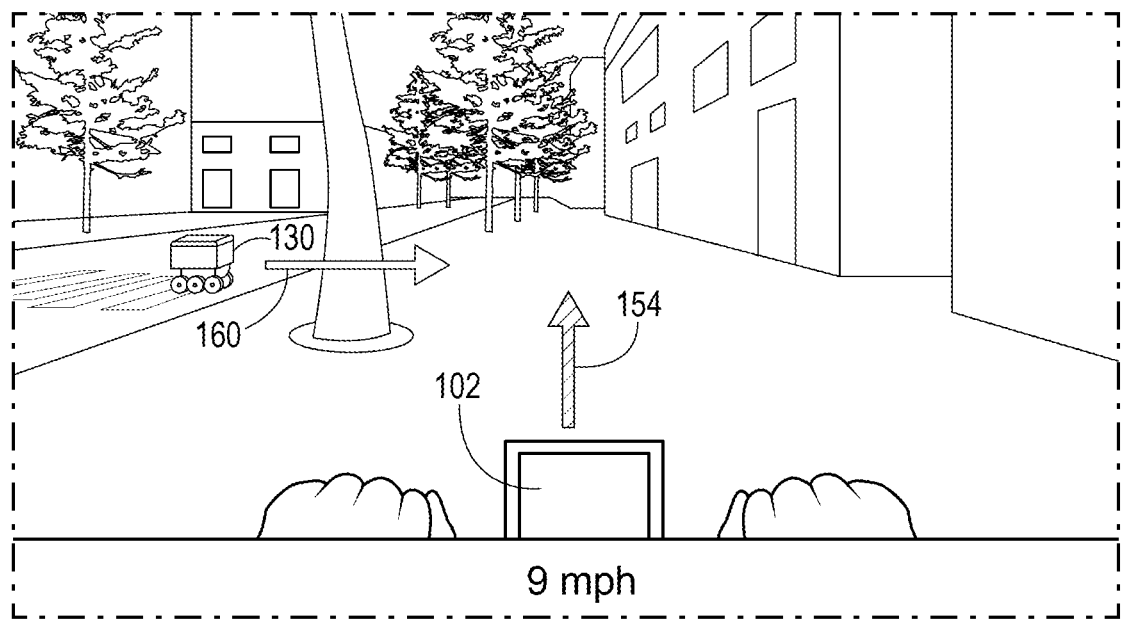
FIG. 3 is a first scenario featuring interaction between the AV and a second vehicle, taken from a point of view of the AV.

FIG. 3 depicts a first scenario S1 featuring an exemplary dyadic bi-directional interaction between the AV 102 and the second vehicle 130 where the first automated travel path 154 and the second automated travel path 160 intersect at a right angle, with the second vehicle 130 approaching the AV 102 from a left side of the surrounding environment. The AV 102 and the second vehicle 130 are positioned along the first automated travel path 154 and the second automated travel path 160 such that the AV 102 and the second vehicle 130 will experience a side-impact collision without at least one of the AV 102 braking or steering from the first automated travel path 154, and the second vehicle 130 braking or steering from the second automated travel path 160.

Figure 4:
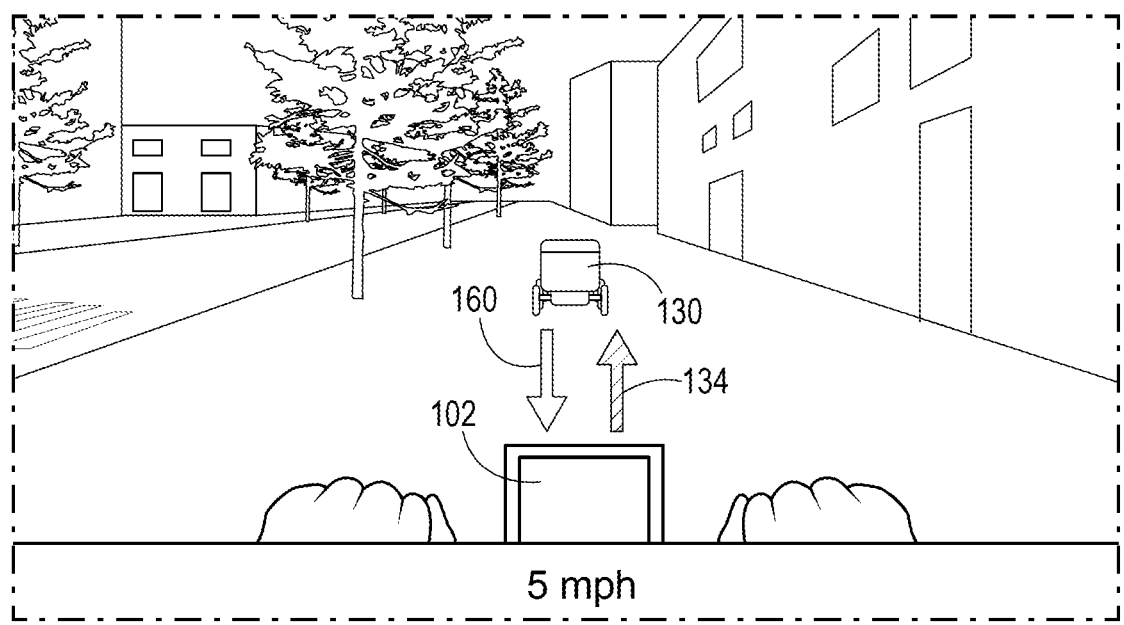
FIG. 4 is a second scenario featuring interaction between the AV and the second vehicle, taken from the point of view of the AV.

FIG. 4 depicts a second scenario S2 featuring an exemplary dyadic bi-directional interaction between the AV 102 and the second vehicle 130 where the first automated travel path 154 and the second automated travel path 160 have opposite directions. The first automated travel path 154 and the second automated travel path 160 are proximate to each other such that the AV 102 and the second vehicle 130 will experience a head-on collision without at least one of the AV 102 deviating from the first automated travel path 154 and the second vehicle 130 deviating from the second automated travel path 160.

Figure 5:
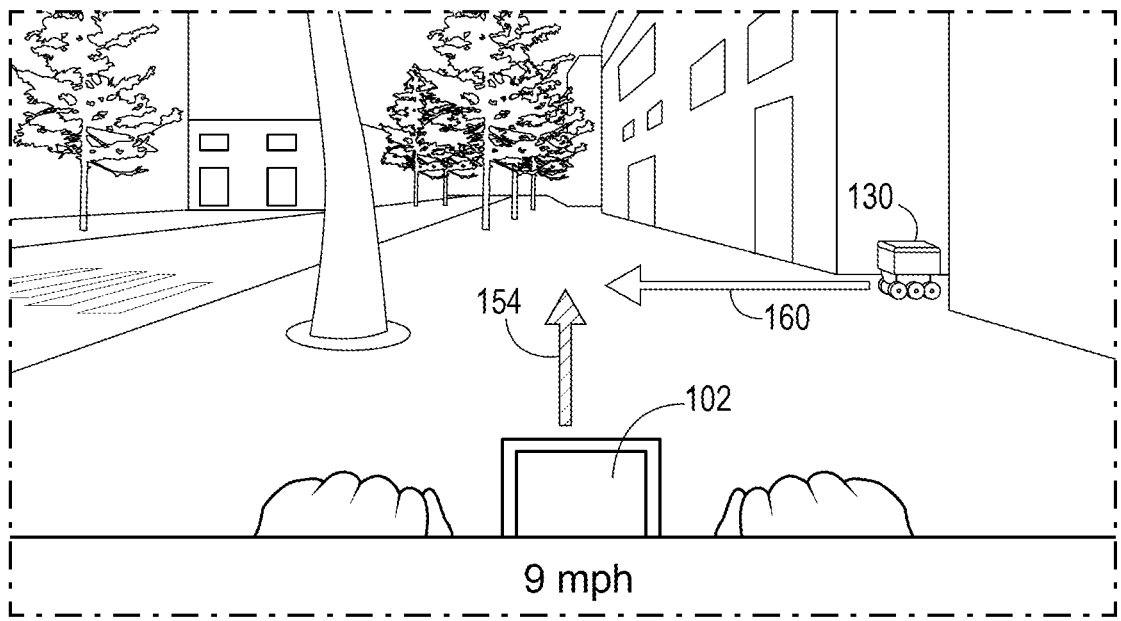
FIG. 5 is a third scenario featuring interaction between the AV and the second vehicle, taken from the point of view of the AV.

FIG. 5 depicts a third scenario S3 featuring an exemplary dyadic bi-directional interaction between the AV 102 and the second vehicle 130 where the first automated travel path 154 and the second automated travel path 160 intersect at a right angle, with the second vehicle 130 approaching the AV 102 from a right side of the surrounding environment. Similar to the first scenario S1, the AV 102 and the second vehicle 130 in the third scenario S3 are positioned along the first automated travel path 154 and the second automated travel path 160 such that the AV 102 and the second vehicle 130 will experience a side-impact collision without at least one of the AV 102 braking or steering from the first automated travel path 154, and the second vehicle 130 braking or steering from the second automated travel path 160.

Figure 6:
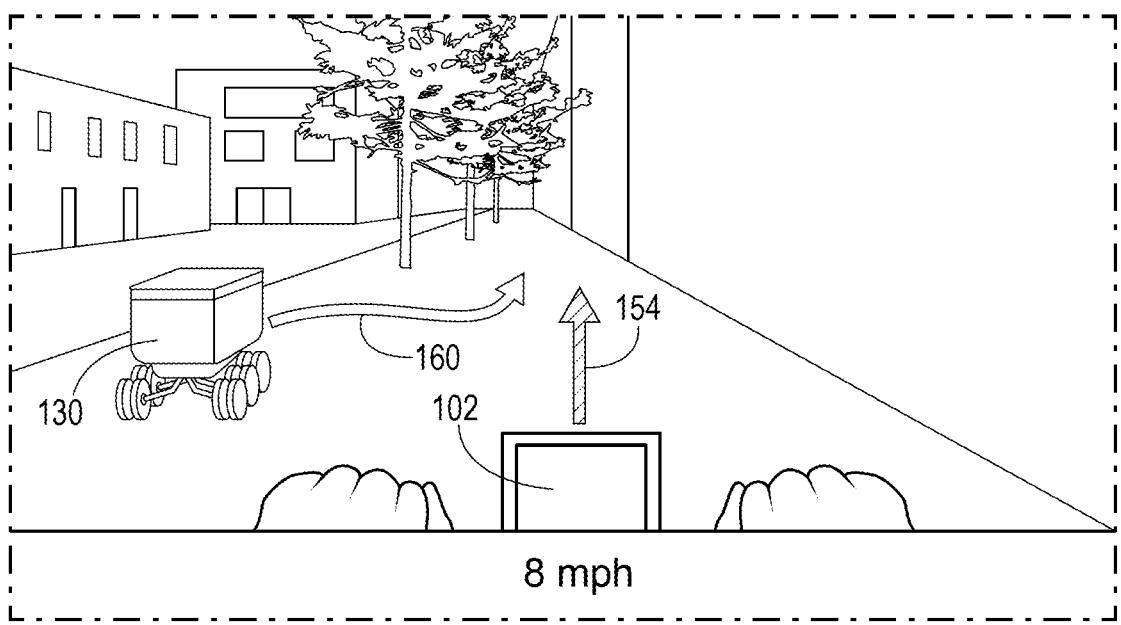
FIG. 6 is a fourth scenario featuring interaction between the AV and the second vehicle, taken from the point of view of the AV.

FIG. 6 depicts a fourth scenario S4 featuring an exemplary dyadic bi-directional interaction between the AV 102 and the second vehicle 130 where the second automated travel path 160 merges into the first automated travel path 154. The AV 102 and the second vehicle 130 are positioned along the first automated travel path 154 and the second automated travel path 160 such that the AV 102 and the second vehicle 130 will experience a sideswipe collision without at least one of the AV 102 braking or steering from the first automated travel path 154, and the second vehicle 130 braking or steering from the second automated travel path 160.

In each scenario S1, S2, S3, S4 depicted in FIGS. 3-6, at least one of the AV 102 and the second vehicle 130 must yield to the other of the AV 102 and the second vehicle 130 to avoid a collision. As such, the other of the AV 102 and the second vehicle 130 may be unyielding in the interaction.

While, as depicted, the second vehicle 130 is a robot delivery vehicle performing automated travel in cooperating with the AV 102, the second vehicle 130 may alternatively be a variety of vehicles including a car, motorcycle, bicycle, scooter, and the like, and may or may not be capable of autonomous travel without departing from the scope of the present disclosure. Also, while the second vehicle 130 is a single vehicle, the second vehicle 130 may be a group of other vehicles that individually interact with the AV 102 in a series of interactions without departing from the scope of the present disclosure. Also, while each scenario S1, S2, S3, S4 depicted in FIGS. 3-6 takes place on a sidewalk, interactions between the AV 102 and other vehicles such as the second vehicle 130 may take place on roads or other areas for vehicle travel without departing from the scope of the present disclosure.

The AV 102 is configured to provide automated travel where the AV 102 yields to the second vehicle 130 in some interactions and not other interactions to elicit user responses indicating a preference by the user 132 for yielding behavior and unyielding behavior with respect to the second vehicle 130. As such, the AV 102 makes a variety of yielding actions and unyielding actions over a variety of interactions between the AV 102 and the second vehicle 130 to receive user responses and determine a tendency toward accommodation by the user 132. In an embodiment, the AV 102 performs a yielding action at every other interaction with the second vehicle 130, and performs an unyielding action at every other interaction.

The AV 102 may or may not immediately respond to the user response so as to deviate from the first automated travel path 154 in any present interaction. For example, the AV 102 may or may not engage brakes operably connected with the brake mechanism 110 to delay travel along the first automated travel path 154 in real-time when the user 132 actuates the brake mechanism 110.

In FIG. 1, the AV 102 includes a survey module 162 configured to provide survey questions to the user 132, and receive corresponding answers from the user 132 through the user interface 120, and through a mobile device 164 operably connected to the AV 102 via the network 136. Survey questions provided by the AV 102 to the user 132 may include requests to indicate previous experience with autonomous features in vehicles, prior micromobility use, and a preferred action by the AV 102 in hypothetical and present, real-time interactions.

Answers to survey questions by the user 132 are stored in the computing device 122 for processing by the travel module 142 and the user effect estimation module 150. In this regard, the user effect estimation module 150 is configured to determine the general state of the user 132, and changes to the general state of the user 132 with respect to wellbeing, trust, and satisfaction in travel with the AV 102 based on the answers to survey questions by the user 132. Also, the travel module 142 is configured to determine the automated travel path of the AV 102 based on the determinations made in the user effect estimation module 150.

In an embodiment, the computing device 122 determines measures of factors including wellbeing, trust, satisfaction with travel, and positive relationship as mean scores of responses by the user 132 to corresponding survey questions. In an embodiment, the answers to survey questions are processed in real-time to adjust automated travel by the AV 102 as the user 132 rides the AV 102 and experiences a series of interactions with the second vehicle 130.

To facilitate high data quality from the survey questions, the survey questions provided by the AV 102 may also include attention check questions and commitment requests before, during, and after a series of interactions between the AV 102 and the second vehicle 130. A commitment request expressly asks that the user 132 provide thoughtful responses to decrease a rate of quality issues.

Attention check questions may include counterfactual statements to assess an attention of the user 132 before recording user responses. An exemplary attention check question may be a counterfactual statement: "I work fourteen months in a year" paired with "yes" and "no" answer options. To avoid recording poor data, no data is recorded when the user 132 fails a threshold number of attention checks, such as two or more attention checks, over a period of time.

The AV 102 provides survey questions directed toward assessing factors of the user 132 including wellbeing, trust, satisfaction with travel, and positive relationship. In an embodiment, the user 132 receives and completes a set of survey questions prior to riding the AV 102 to measure initial social interaction perceptions that capture content, positive relationship, and wellbeing of the user 132. The AV 102 may additionally or alternatively survey the user 132 after each interaction between the AV 102 and the second vehicle 130, where the user 132 answers questions regarding wellbeing, trust, satisfaction, and positive relationship. The AV 102 may additionally or alternatively survey the user 132 after a series of interactions between the AV 102 and the second vehicle 130, where the user 132 answers questions regarding wellbeing, trust, positive relationship, and satisfaction.

Survey questions directed toward positive relationship may be framed as both the user's 132 relationship toward others, and others' relationship toward the user 132. For example, the survey questions may include statements such as: "Based on the current interaction, I am content with the relation with the other vehicle," and "Based on the current interaction, I think the delivery robot around me handle others in a positive manner," where each statement is respectively paired with a variety of answers indicating a margin of agreement by the user 132.

Survey questions directed toward satisfaction with travel may be directed to positive activation, positive deactivation, and cognitive evaluation. For example, the survey questions may include statements such as: "During my current travel event I was worried," "During my current travel I was confident," "During my current travel event I was tired," "During my current travel event I was alert," "My current travel event worked poorly," and "My current travel event worked well," where each statement is respectively paired with a variety of answers indicating a margin of agreement by the user 132.

Survey questions directed toward wellbeing may directly enquire the wellbeing of the user 132 with respect to riding the AV 102. For example, the survey questions may include a statement such as: "This travel event contributes to my wellbeing," where the statement is paired with a variety of answers indicating a margin of agreement by the user 132.

Survey questions directed toward trust may be framed to assess trust in others by the user 132, and trust in the AV 102 by the user 132. For example, the survey questions may include a statement such as: "Based on the current interaction, I trust robots in my surrounding," and "Based on the current interaction, I trust my self-driving scooter," where the statement is paired with a variety of answers indicating a margin of agreement by the user 132.

To assess initial perceptions of social interactions between the user 132 and other road users, survey questions are directed to cover general contentment between sidewalk and road users, positive relationship between sidewalk and road users, and perceived ego wellbeing as a result of experiences by the user 132 with other sidewalk users and road users. As an example, a survey question directed toward initial contentment in social wellbeing may include a statement such as: "Generally, I am content with the relation with sidewalk and road users," where the statement is paired with a variety of answers indicating a margin of agreement by the user 132. As another example, a survey question directed toward initial positive relation in social wellbeing may include a statement such as: "Generally, I think the sidewalk and road users around me interact with each other in a positive manner," where the statement is paired with a variety of answers indicating a margin of agreement by the user 132. As another example, a survey question directed toward initial ego in social wellbeing may include a statement such as: "Generally, experience with sidewalk and road users contributes to my wellbeing," where the statement is paired with a variety of answers indicating a margin of agreement by the user 132.

To determine intention by the user 132 in an interaction where the ego is the contributor, the user 132 may be asked: "What action would you like your self-driving scooter to take regarding the delivery robot?" Two options are given to the user 132, with one option implying a yielding action by the AV 102, and the other option implying an unyielding action by the AV 102. By asking this question, the computing device 122 may determine whether the intention by the user 132 aligns with the behavior of the AV 102 in a particular interaction.

Referring back to FIG. 1, the computing device 122 includes a processor 170, a memory 172, a data store 174, and a communication interface 180, which are each operably connected for computer communication via the bus 124. The communication interface 180 provides software and hardware to facilitate data input and output between the components of the computing device 122 and other components, networks, and data sources described herein.

The memory 172 stores data indicating user responses and survey question answers from the user 132, and corresponding interaction information for retrieval by the processor 170. The processor 170 is configured measure influence of automated travel by the AV 102 to the user 132 with respect to wellbeing, trust, satisfaction with travel, and positive relationship based on the detected interactions between the AV 102 and the second vehicle 130, the corresponding user feedback, and the answers to survey questions by the user 132.

More specifically, the processor 170 performs a regression analysis with a linear mixed effects model stored in the memory 172. The linear mixed effects model uses lme4 package in R to measure the influence on wellbeing, trust, and satisfaction to the user 132 by the AV 102. In an embodiment, the following linear mixed effects model may be used for determining dependent variables (DVs):

$$DV \sim \text{Robot yielding} + \text{AV scooter yielding} + \text{Braking frequency} + \text{Social interaction perception} + \text{Scenarios} + \text{Alignment} + (1|\text{User}) + \epsilon$$

With reference to the above linear mixed effects model, the dependent measures are based on the answers to survey questions by the user 132 directed toward satisfaction with travel, wellbeing, trust, and positive relationship.

FIG. 7 is a table of exemplary, statistically significant estimates from regression analysis performed by the processor 170 for a plurality of series of two recorded scenarios. The table is stored as a database in the memory 172. The plurality of series of two scenarios analyzed by the processor include S2→S1, S1→S4, and S3→S2.

As shown in FIG. 7, results from the regression analysis performed by the processor 170 indicate that interaction with other road users influenced self-reported measures for a plurality of users including the user 132. In this regard, yielding behavior by the second vehicle 130 positively influenced the state of wellbeing, satisfaction, and trust in other road users when the user 132 interacted with the second vehicle 130 during the first interaction in the series.

With respect to wellbeing of the user 132, results from the regression analysis also indicate that yielding behavior toward the AV 102 from the second vehicle 130 provided an increase in wellbeing of the user 132 in the first interaction in the series. Additionally, a frequency of the user 132 actuating the brake mechanism 110 is negatively associated with wellbeing. Out of the series of scenarios recorded, S2→S1 resulted in an increase in wellbeing, and the social interaction perceptions on ego wellbeing also increased wellbeing of the user 132 for both interactions in the series.

With respect to satisfaction in travel by the user 132, results from the regression analysis indicate that yielding behavior toward the AV 102 from the second vehicle 130 provided an increase in satisfaction in both interactions in the series. In this regard, a frequency of the user 132 actuating the brake mechanism 110 is negatively associated with satisfaction in the first interaction in the series. The results from the regression analysis also indicate that ego wellbeing increases satisfaction for only the first interaction in the series. For both interactions in each series, scenarios S2→S1, S3→S2, and S1→S4 are associated with an increased satisfaction in travel.

With respect to trust by the user 132, results from the regression analysis indicate that yielding behavior toward the AV 102 from the second vehicle 130 provided an increase in trust in other road users in the first interaction in the series. In this regard, a frequency of the user 132 actuating the brake mechanism 110 is negatively associated with trust in other road users in the first interaction in the series. The results from the regression analysis also indicate that perceived ego wellbeing increases trust in others by the user 132 for both interactions in the series.

With continued reference to FIG. 7, for the first interaction in the series, yielding behavior toward the second vehicle 130 from the AV 102 resulted in negative impact on trust in others by the user 132. In this manner, an alignment in action by the AV 102 and the second vehicle 130 resulted in positive influence on trust in others by the user 132. The perceived ego wellbeing of the user 132 increased trust in other vehicles for the first interaction in the series, while trust in the AV 102 increased due to perceived ego wellbeing, and perceived positive relations with the second vehicle 130 in the first interaction. In the second interaction in the series, braking frequency is associated with decreased trust in the AV 102 by the user 132, while yielding behavior by the AV 102 is associated with increased trust in the AV 102 by the user 132.

Estimates from the regression analysis performed in FIG. 7 show that the yielding behavior of the second vehicle 130 and the yielding behavior of the AV 102 increased wellbeing and trust in the AV 102, indicating any yielding behavior from the second vehicle 130 enhanced the wellbeing and trust by the user 132. Conversely, the AV 102 yielding resulted in lower trust by the user 132 toward the second vehicle 130, indicating an interplay between trust in the AV 102 trust in the second vehicle 130, given the actions of other road users riding the second vehicle 130.

Wellbeing, trust, and satisfaction in travel of the user 132 were positively influenced by initial social interaction perceptions. This indicates initial perceptions by the user 132 about their social interactions and how the initial perceptions impact trust and wellbeing during interactions with other road users riding the second vehicle 130.

With continued reference to the estimates provided in FIG. 7, different scenarios also impacted the wellbeing, trust, and satisfaction in travel by the user 132. In this regard, all scenarios except for the series S1→S4 indicate an increase in wellbeing, trust, and satisfaction in travel by the user 132. Interactions between the AV 102 and the second vehicle 130 where the second vehicle 130 approaches the AV 102 from behind also effects trust and satisfaction in travel by the user 132 riding the AV 102.

The estimates also indicate a negative impact of braking frequency on trust, wellbeing, and satisfaction in travel by the user 132, which indicates the user 132 expressing higher perceived risk through actuating the brake mechanism 110. In this manner, the estimates produced in the regression analysis performed by the computing device 122 indicate and quantify how social interactions with different behaviors impact a state of the user 132, including wellbeing.

As such, the AV 102 provides a human-aware system to enhance the wellbeing of the user 132 in automated travel by the AV 102. In this regard, the AV 102 is configured to adapt automated travel of the user 132 based on a detected scenario in the surrounding environment of the AV 102, and according to a perception of the detected scenario by the user 132.

The AV 102 is also configured to adapt automated travel of the user 132 based on objective indicators such as the user's 132 braking intentions, prior knowledge of user's 132 wellbeing, and the user's 132 measured perception about their social interactions. These indicators are determined by the computing device 122 based on the user responses and the answer to survey questions.

The computing device 122 includes a predictive model stored in the memory 172 and utilized by the processor 170 to predict the change in wellbeing based on the estimates produced from the regression analysis, and to propose an optimal policy to increase the wellbeing of the user 132. With this construction, the processor 170 predicts influence on the user 132 based on the estimates produced from the regression analysis with respect to the yielding behaviors of the AV 102 and the second vehicle 130, a scenario type, a measured influence of social interaction on ego wellbeing, and a braking behavior from the user 132.

In this manner, the AV 102 is configured to provide a human-aware system able to utilize action and response data from the user 132 to make determinations in automated travel that enhance the wellbeing of the user 132. To this end, the AV 102 is configured to first predict the wellbeing of the user 132, and then utilize the predicted wellbeing to calculate an optimal action of automated travel.

More specifically, the predictive model stored in the memory 172 is a classification model that may predict change in wellbeing as a binary variable that increases or decreases. In an embodiment, the wellbeing of the user 132 is calculated as an average value of associated user responses and answers to survey questions to combine the effect of trust, satisfaction, and positive relation in others.

Data indicating the past experience of the user 132, actions by the AV 102 and the second vehicle 130, scenario type, and initial wellbeing and braking behavior of the user 132 are incorporated in the predictive model as potential predictors of wellbeing, satisfaction in travel, and trust by the user 132. Past experiences of the user 132 provided to the predictive model include prior micromobility use and the responses by the user 132 to the survey questions directed to social interaction perception.

Actions by the second vehicle 130 in interactions with the AV 102 are processed in the predictive model as a binary variable, where 1 represents yielding behavior, and 0 represents unyielding behavior in the first interaction of a series of interactions. Actions by the AV 102 in interactions with the second vehicle 130 are also processed in the predictive model as a binary variable, where 1 represents yielding behavior, and 0 represents unyielding behavior in the first interaction of a series of interactions.

The processor 170 calculates the initial wellbeing of the user 132 based on the user response in the first interaction in a series. The change in the wellbeing of the user 132 incorporated in the predictive model is defined as decreasing if the answers to survey questions directed to wellbeing in a second interaction in the series decreases as compared to the first interaction in the series. The change in the wellbeing of the user 132 is defined as increasing if the wellbeing of the user 132 remains the same or increases in the second interaction as compared to the first interaction in the series.

Scenario types incorporated in the predictive model include S1, S2, S3, and S4 respectively depicted in FIGS. 3-6. The scenario types are one-hot encoded to represent categorical variables as numerical values in the predictive model.

User responses to automated travel by the AV 102 are incorporated in the predictive model as binary variables associated with a mode of user response. In this regard, the user 132 actuating the brake mechanism 110 is defined in the predictive model as a binary variable of whether the user 132 indicated a desire to brake before the intention question in the second interaction or not. The user 132 actuating the accelerator mechanism 112 is defined in the predictive model as a binary variable of whether the user 132 indicated a desire to accelerate before the intention question in the second interaction or not. Steering inputs from the steering control 114, gesture inputs from the vehicle sensors 104, and other direct inputs from the user interface 120 and the mobile device 164 are also respectively defined in the predictive model as binary variables which indicate an alignment of user intent with automated travel performed by the AV 102.

The predictive model is trained as a classification model to predict wellbeing change of the user 132. The predictive model may, for example, incorporate logistic regression (LR), support vector classifier (SVC) with radial basis function (RBF) kernel, random forest (RF) classifier, and AdaBoost classifier. To identify a best set of features for each of the incorporated classifiers, the processor 170 obtains a smallest feature set that maximizes the area under the curve (AUC) for receiver's operating characteristics (ROC).

The processor 170 calculates the AUC-ROC using 5-fold cross-validation during the feature selection where, based on the selected feature set for each model, the processor 170 calculates the model's performance using 5-fold cross-validation. In an embodiment, each fold in the cross-validation includes a different set of users of the AV 102 similar to the user 132. In an embodiment, the processor 170 iterates the cross-validation 1000 times with a randomized split of users across the folds in each iteration to obtain robust performance metrics for user distribution.

Figures 8, 9:
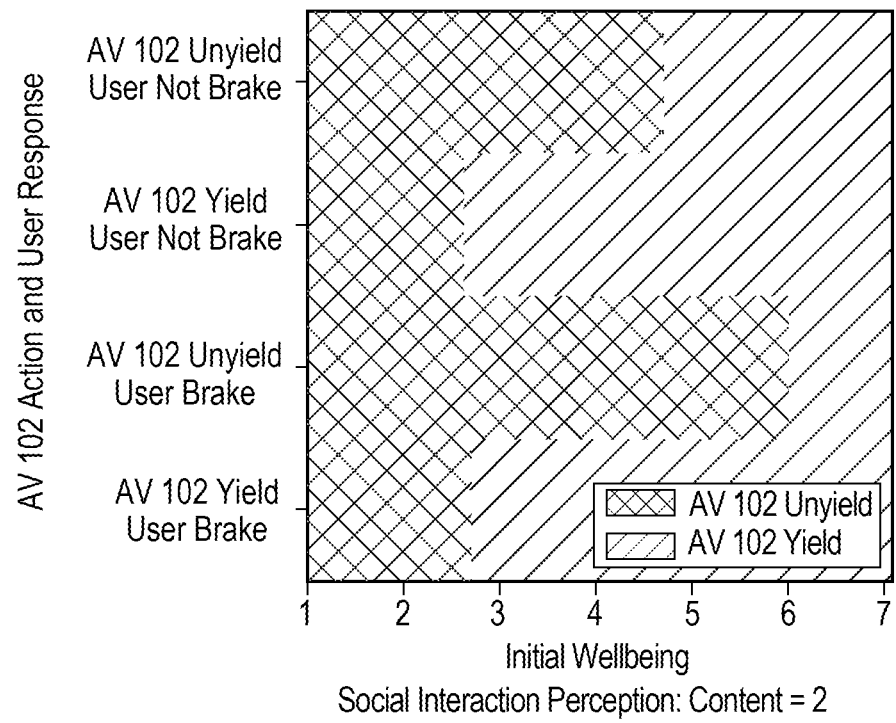
FIG. 8 is a table of performance metrics of models for autonomous travel by the AV.
FIG. 9 is a chart of a first learned optimal policy of automated travel by the AV based on a first set of predictor values.

FIG. 8 is a table of exemplary performance metrics of the tested models across the 1000 iterations with a 95% confidence interval (CI), stored in the memory 172 as a database. As shown in FIG. 8, the SVC outperforms other models with an average AUC-ROC of 0.7136. The best feature set selected for the SVC includes the following predictors: 1) prior micromobility use by the user 132 (yes or no), 2) social interaction perception-content of the user 132, 3) social interaction perception-ego wellbeing of the user 132, 4) scenario type, 5) initial wellbeing of the user 132, 6) actions by the second vehicle 130 toward the AV 102, 7) braking behavior by the user 132 in the AV 102, and 8) actions by the AV 102 toward the second vehicle 130.

The predictive model employed to predict a change in wellbeing of the user 132 is also configured to determine an optimal choice of automated travel by the AV 102 with respect to the wellbeing of the user 132, based on a chosen set of predictors associated with a given model. As an example, x denotes a vector of the 8 predictors associated with the SVC model, and $x^{\backslash\{e\}}$ denotes a vector of 7 predictors that are the 8 predictors excluding the actions by the AV 102 toward the second vehicle 130, and let $e \in \{E_u, E_y\}$ denote actions by the AV 102 toward the second vehicle 130. The learned model f: x→Δw predicts a likelihood of change in wellbeing $\Delta w \in \{\Delta w_\downarrow, \Delta w_\uparrow\}$ in the following equation:

$$Pr(\Delta w \mid x) = Pr(\Delta w \mid x^{\backslash\{e\}}, e). \tag{1}$$

The optimal policy for automated travel by the AV 102 is defined as maximizing the likelihood of an increase in wellbeing $\Delta w \uparrow$. In this manner, the computing device 122 processing predictors based on the predictive model supports the AV 102 as a human-aware system aimed at increasing users' wellbeing. An optimal policy π(e) for action by the AV 102 $e \in \{E_u, E_y\}$ is given as the following equation:

$$\pi(e) = \arg\max Pr(\Delta w_\uparrow \mid x^{\backslash\{e\}}, e). \tag{2}$$
$$e \in \{E_u, E_y\}$$

In an embodiment, the AV 102 has access to past data indicating experiences, social interaction perceptions, braking behavior by the user 132, and corresponding scenario type before an interaction in a present series takes place. The past data and may be stored as a database in the memory 172 or retrieved from the network 136, and is processed by the computing device 122 with the predictive model. The AV 102 may process the past data with the predictive model to determine and execute optimal yielding action in automated travel by the AV 102 prior to a beginning of a series of interactions with the second vehicle 130.

To further analyze the optimal policy, the processor 170 trains the predictive model using data generated from a plurality of series, and visualizes the policy for different combinations of the chosen predictors. In an embodiment, the processor 170 visualizes policies with respect to an effect of social interaction perception responses and prior micromobility use of the user 132 on a learned optimal policy.

Figure 10:
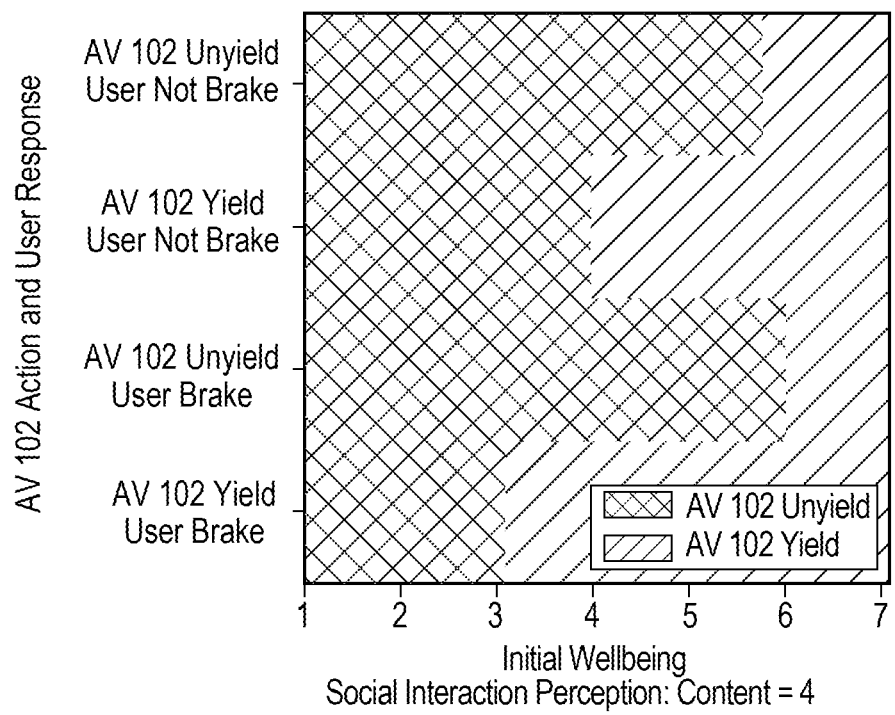
FIG. 10 is a chart of a first learned optimal policy of automated travel by the AV based on a second set of predictor values.
Figure 11:
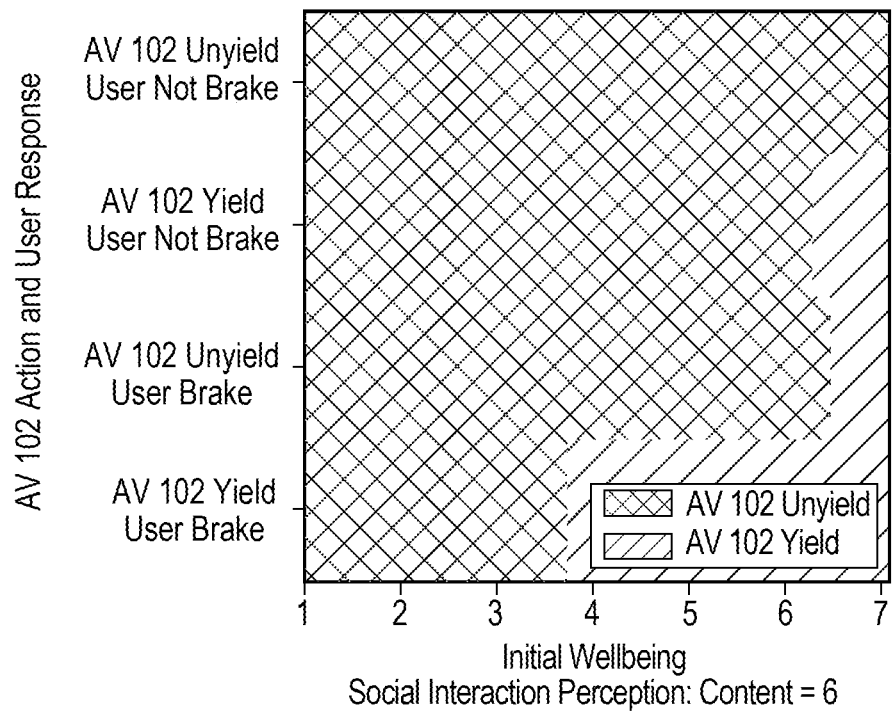
FIG. 11 is a chart of a first learned optimal policy of automated travel by the AV based on a third set of predictor values.

FIGS. 9-11 depict charts of learned optimal policies which relate actions by the AV 102 and user responses such as braking behavior to an initial wellbeing of the user 132 to visualize optimal policy with varying values of social interaction perception-content associated with the user 132. In this regard, x-axes of the charts map the initial wellbeing, and the y-axes show actions by the AV 102 and corresponding user responses.

With reference to FIGS. 9-11, predictors except social interaction perception-content are fixed to median values, where the user 132 has no prior micromobility use, social interaction perception-ego wellbeing has a value of 5, and the series recorded includes scenario S4 as a first interaction and scenario S3 as a second interaction. Textured regions of the charts indicate an action for optimal automated travel by the AV 102 given the initial wellbeing of the user 132, where the action is one of yielding and unyielding with respect to the second vehicle 130 based on the learned optimal policy.

As shown in FIG. 9, optimal action by the AV 102 in automated travel is unyielding when the initial wellbeing of the user 132 is low, and yielding when the initial wellbeing of the user 132 is high. The learned optimal policy shown in FIG. 9 also indicates that when the second vehicle 130 is unyielding to the user 132 in a most previous interaction, the learned optimal policy shows that the wellbeing of the user 132 will increase if the AV 102 does not yield to the second vehicle 130, including when at least one of the user responses and the answers to survey questions indicate that the wellbeing of the user 132 is high as compared to a median value.

The learned optimal policy also indicates that the AV 102 yielding to the second vehicle 130 will increase the wellbeing of the user 132 when the second vehicle 130 yielded to the AV 102 in the most previous interaction, when the wellbeing of the user 132 is above a threshold value. This suggests behavior driven by the learned optimal policy reflects an indirect upstream reciprocity behavior of the user 132, where prior help from the second vehicle 130 motivates the user 132 to help the other vehicles in a subsequent interaction to increase the wellbeing of the user 132. In this manner, the computing device quantifies braking behavior by the user 132 to estimate optimal action by the AV 102 during automated travel.

FIG. 9 depicts the learned optimal policy based on a relatively low social interaction perception content value of 2 associated with the user 132. FIG. 10 depicts the learned optimal policy based on an intermediate social interaction perception content value of 4 associated with the user 132. FIG. 11 depicts the learned optimal policy based on a relatively high social interaction perception content value of 6 associated with the user 132.

Except for the variety of social interaction perception content values, FIGS. 9-11 depict the learned optimal policy based on predictors with consistent values. In this manner, FIGS. 9-11 collectively depict an effect of social interaction perception content value on the learned optimal policy. Comparing the learned optimal policies of FIGS. 9-11 indicates that when the user 132 has high contentment with their relationship with sidewalk users and road users as compared to a median value, the user 132 is more inclined toward not yielding to the second vehicle 130 even for higher levels of wellbeing.

Figure 12:
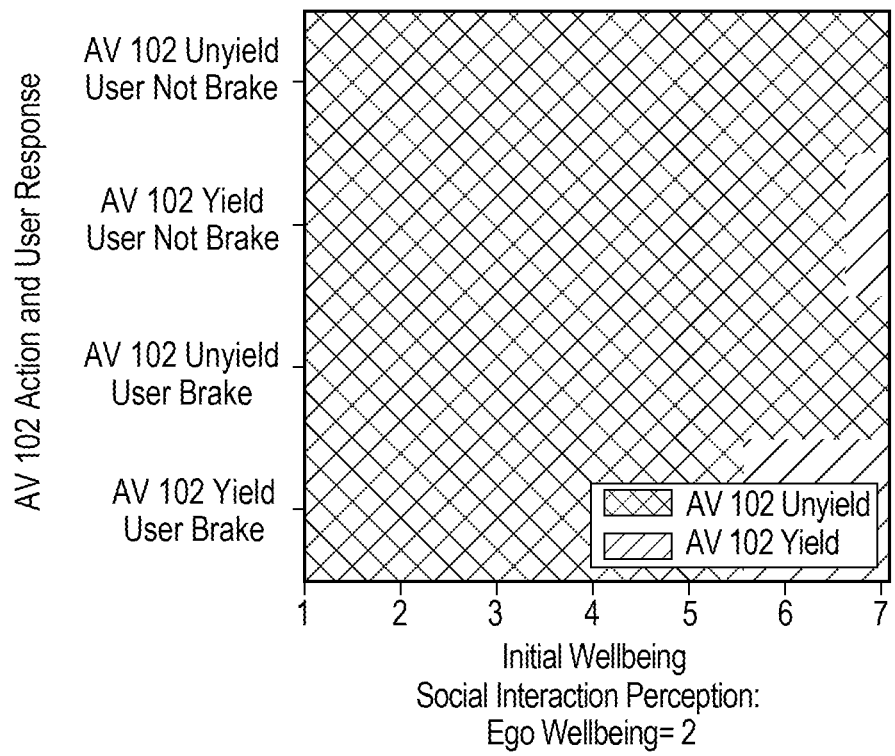
FIG. 12 is a chart of a first learned optimal policy of automated travel by the AV based on a fourth set of predictor values.
Figure 13:
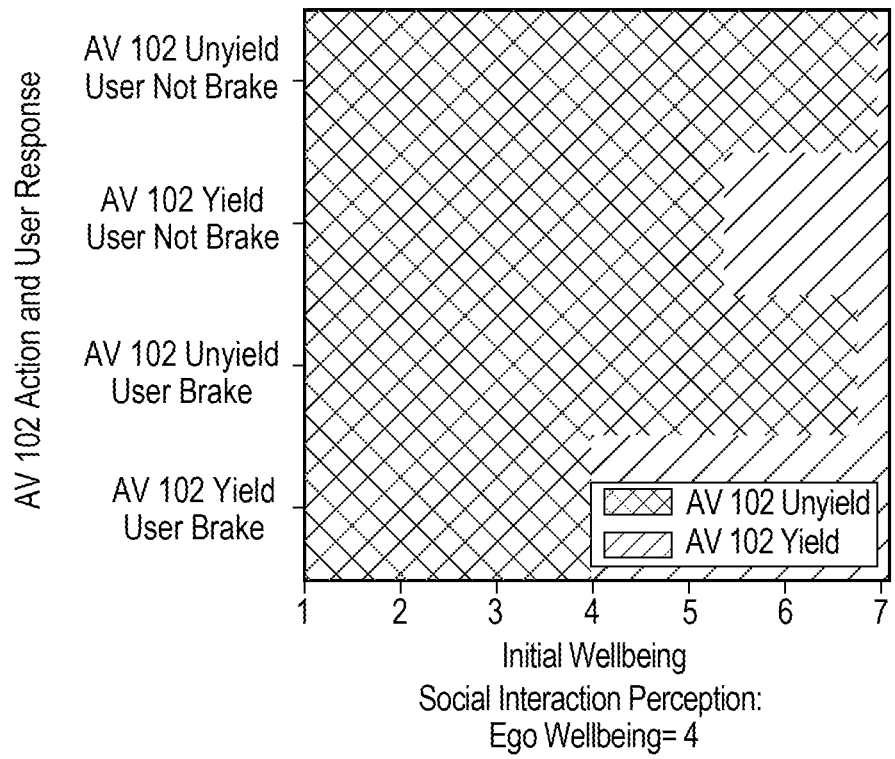
FIG. 13 is a chart of a first learned optimal policy of automated travel by the AV based on a fifth set of predictor values.
Figure 14:
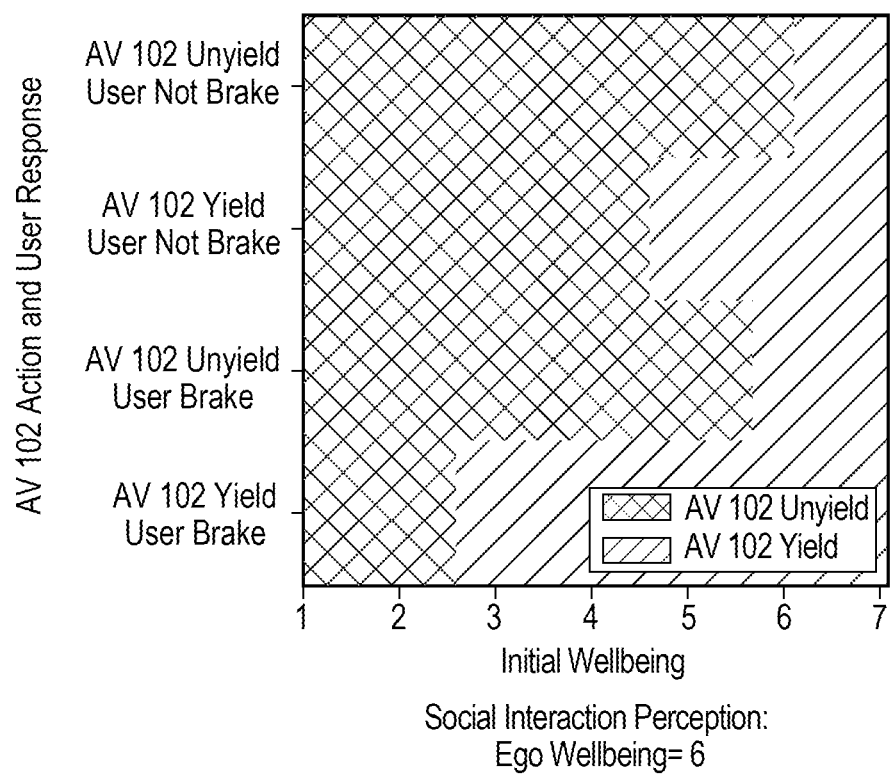
FIG. 14 is a chart of a first learned optimal policy of automated travel by the AV based on a sixth set of predictor values.

FIGS. 12-14 depict charts of learned optimal policies which relate actions by the AV 102 and user responses such as braking behavior to an initial wellbeing of the user 132 to visualize optimal policy with varying values of social interaction perception-ego wellbeing associated with the user 132. In this regard, x-axes of the charts map the initial wellbeing, and the y-axes show actions by the AV 102 and corresponding user responses.

With reference to FIGS. 12-14, predictors except social interaction perception-content are fixed to median values, where the user 132 has no prior micromobility use, social interaction perception-content has a value of 5, and the series recorded includes scenario S4 as a first interaction and scenario S3 as a second interaction. Textured regions of the charts indicate an action for optimal automated travel by the AV 102 given the initial wellbeing of the user 132, where the action is one of yielding and unyielding with respect to the other vehicle 130 based on the learned optimal policy.

FIG. 12 depicts the learned optimal policy based on a relatively low social interaction perception ego wellbeing value of 2 associated with the user 132. FIG. 13 depicts the learned optimal policy based on an intermediate social interaction perception ego wellbeing value of 4 associated with the user 132. FIG. 14 depicts the learned optimal policy based on a relatively high social interaction perception content value of 6 associated with the user 132.

Except for the variety of social interaction perception ego wellbeing values, FIGS. 12-14 depict the learned optimal policy based on predictors with consistent values. In this manner, FIGS. 12-14 collectively depict an effect of social interaction perception ego wellbeing value on the learned optimal policy.

Comparing the learned optimal policies of FIGS. 12-14 indicates that when the user 132 has higher survey response values with respect to social interaction perception, the user 132 is more inclined to yield to the second vehicle 130 for wellbeing to increase. This suggested behavior by the learned optimal policy reflects a preference among more prosocial users of the AV 102 to help the second vehicle 130 by yielding. In this manner, the learned optimal policy is configured to distinguish perceptions of social interactions by the user 132 to ensure optimal actions by the AV 102 during automated travel.

As a whole, the learned optimal policies depicted in FIGS. 9-14 indicate that survey questions answered by the user 132 are influenced by the user's 132 interactions with the second vehicle 130 and corresponding intent. The learned optimal policies also indicate that any yielding behavior contributed toward the AV 102 would lead to enhancing the wellbeing and the trust of the user 132. The learned optimal policies also indicate that social interaction perception by the user 132 may impact the influence of other factors on the user's 132 change in wellbeing. The learned optimal policies also indicate that optimal actions for automated travel by the AV 102 are not only dependent on behavior by the second vehicle 130 and the user 132, but also depend on predispositions by the user 132 about their social interactions. In this manner, learned optimal policies calculated by the computing device accommodate an element of traffic interaction dependent upon human nature, including prosocial interactions between agents, that impact wellbeing, trust, and satisfaction of the user 132.

The computing device 122 continually calculates learned policies based on real-time data including user responses to automated travel by the AV 102, answers to survey questions from the user 132, and corresponding interaction data. With this, the AV 102 continually adjusts automated travel with the user 132 according to a most recently calculated learned optimal policy during a series of interactions.

In an embodiment, the predictive model employed by the processor 170 includes dynamic relations across time to improve model performance. In a further embodiment, the predictive model employed by the processor 170 produces multi-objective policies, and considers cognitive states including trust and workload of the user 132 along with goal related costs.

Methods for Providing Automated Travel with an AV

Figure 15:
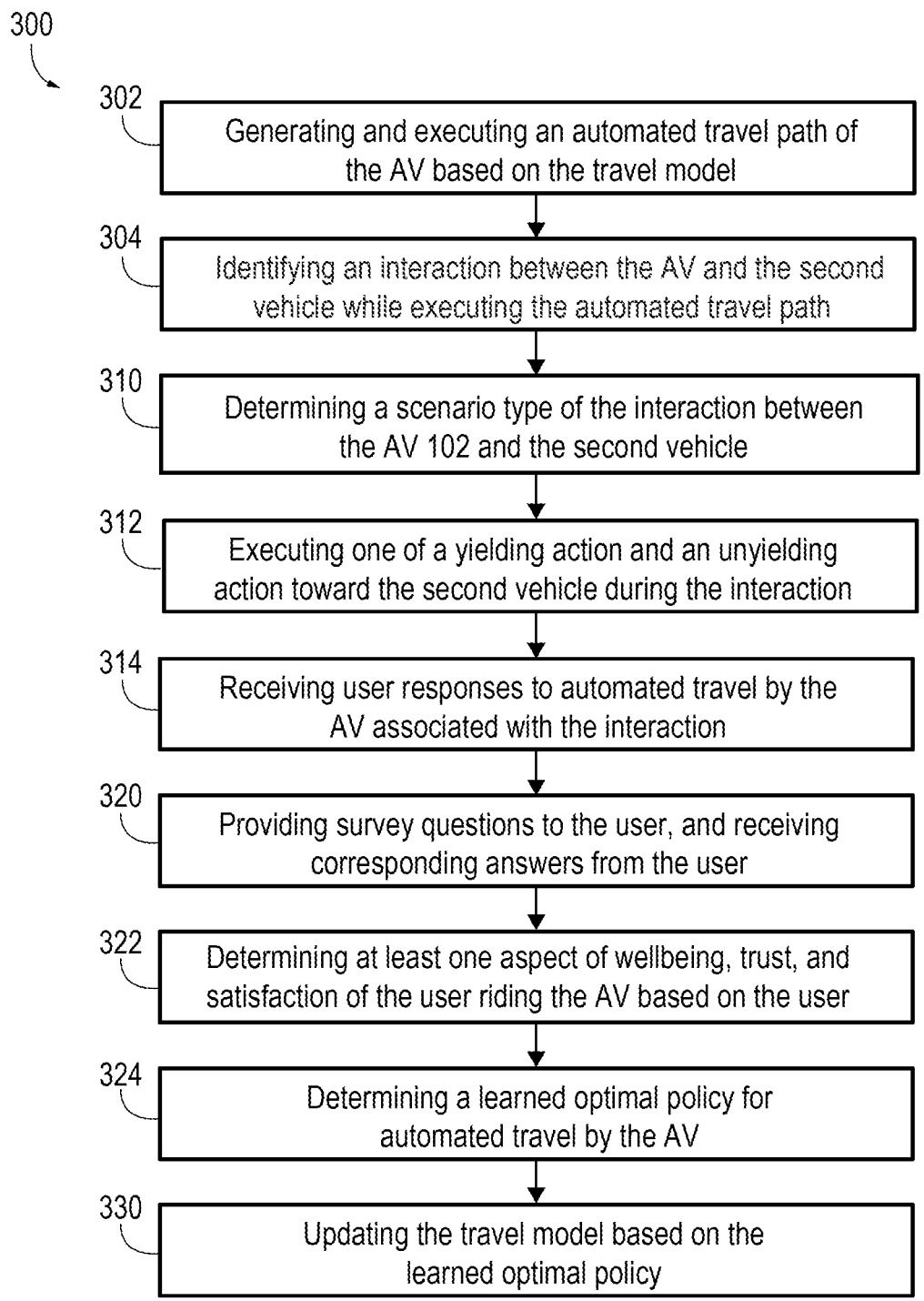
FIG. 15 is an exemplary process flow for an iterative analysis for increasing wellbeing, trust, and satisfaction of a user with respect to automated travel by the AV, according to one aspect.

Referring to FIG. 15, a computer-implemented method for providing automated travel of the user 132 with the AV 102 will be described according to an exemplary embodiment. FIG. 15 will be described with reference to FIGS. 1-14. For simplicity, the method 300 will be described as a sequence of blocks, but the elements of the method 300 may be organized into different architectures, elements, stages, and/or processes.

At block 302, the method 300 includes generating and executing an automated travel path of the AV 102 based on the travel model. At block 304, the method includes identifying an interaction between the AV 102 and the second vehicle 130 while executing the automated travel path. In an embodiment, identifying the interaction between the AV 102 and the second vehicle 130 includes identifying the interaction as a dyadic bi-directional interaction featuring path symmetry between the AV 102 and the second vehicle 130, wherein at least one of the AV 102 and the second vehicle 130 must perform a yielding action to avoid collision.

At block 310, the method 300 includes determining a scenario type of the interaction between the AV 102 and the second vehicle 130. At block 312, the method 300 includes executing one of a yielding action and an unyielding action toward the second vehicle 130 during the interaction.

At block 314 the method includes receiving user responses to automated travel by the AV 102 associated with the interaction with the second vehicle 130. The user responses received at block 314 are generated by the user 132 actuating at least one of the brake mechanism 110, the accelerator mechanism 112, the steering control 114, and the user interface 120 included in the AV 102.

At block 320, the method 300 includes providing survey questions to the user 132, and receiving corresponding answers from the user 132 through at least one of the user interface 120 and the mobile device 164 of the user 132. At block 322, the method 300 includes determining at least one aspect of wellbeing, trust, and satisfaction of the user riding the AV based on the user responses.

At block 324, the method 300 includes determining a learned optimal policy for automated travel by the AV 102 which increases the at least one aspect of wellbeing, trust, and satisfaction of the user 132 based on the user responses. The method may further include determining the learned optimal policy based on the user responses associated with the interaction, the scenario type of the interaction, the action taken by the AV 102 during the interaction, and the answers to survey questions.

Determining the learned optimal policy at block 324 includes determining the learned optimal policy as output of the predictive model trained using data generated from interactions between the AV 102 and other vehicles such as the second vehicle 130. In this regard, the predictive model incorporates data indicating at least one of past experience of the user 132, actions by the AV 102 toward the second vehicle 130, actions by the second vehicle 130 toward the AV 102, a scenario type of the interaction, an initial aspect of wellbeing of the user 132, and user responses from the user 132 as predictors for the at least one aspect of wellbeing, trust, and satisfaction of the user 132. At block 330, the method 300 includes updating the travel model based on the learned optimal policy, where the computing device 122 generates and executes the automated travel path based on the travel model as the travel model is updated.

Figure 16:
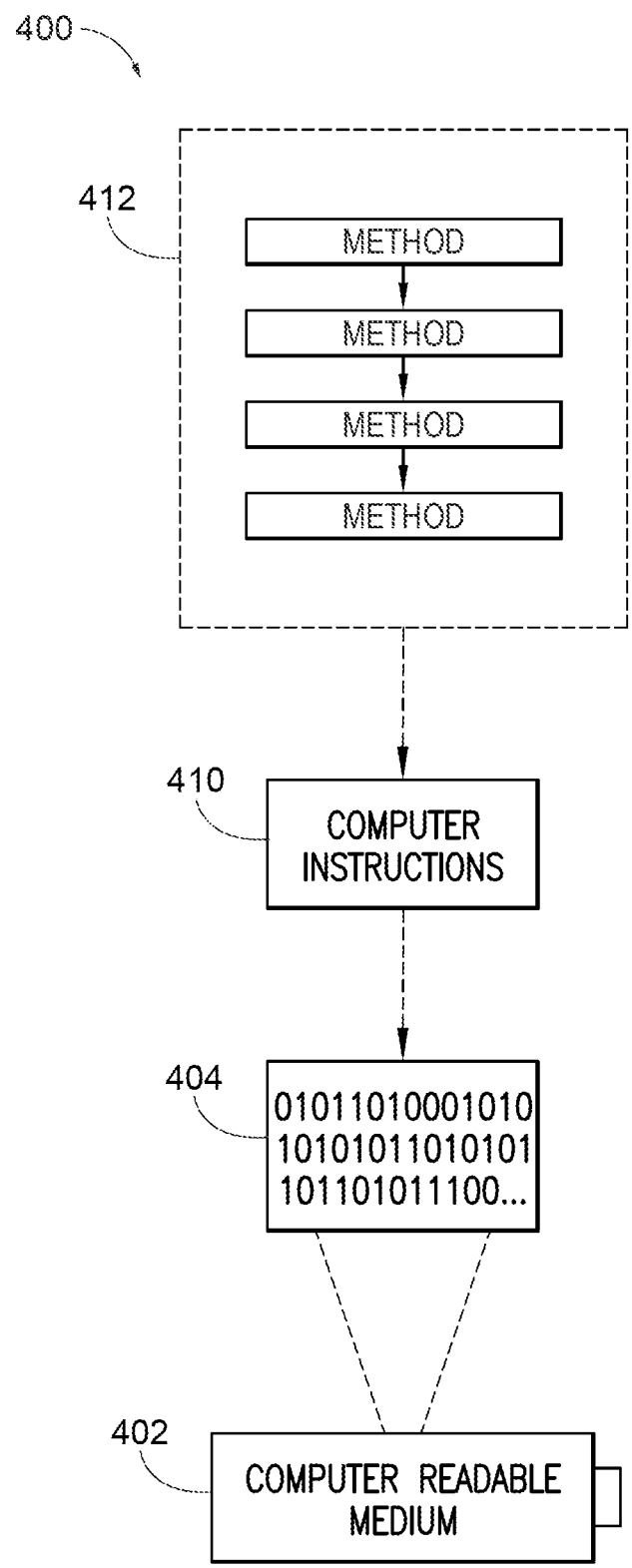
FIG. 16 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement one aspect of the techniques presented herein. An aspect of a computer-readable medium or a computer-readable device devised in these ways is illustrated in FIG. 16, wherein an implementation 400 includes a computer-readable medium 402, such as a CD-R, DVD-R, flash drive, a platter of a hard disk drive, etc., on which is encoded computer-readable data 404. This encoded computer-readable data 404, such as binary data including a plurality of zero's and one's as shown in 404, in turn includes a set of processor-executable computer instructions 410 configured to operate according to one or more of the principles set forth herein. In this implementation 400, the processor-executable computer instructions 410 may be configured to perform a method 412, such as the method 300 of FIG. 15. In another aspect, the processor-executable computer instructions 410 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An automated vehicle (AV) configured to perform automated travel, the AV comprising:
   vehicle sensors configured to detect a second vehicle in a surrounding environment of the AV;
   at least one of a brake mechanism, an accelerator mechanism, a steering control, and a user interface configured to generate a user response to automated travel by the AV; and
   a computing device configured to:
   generate and execute an automated travel path based on a travel model;
   identify an interaction between the AV and the second vehicle in the surrounding environment of the AV while executing the automated travel path,
   receive user responses to automated travel by the AV associated with the interaction with the second vehicle;
   determine at least one aspect of wellbeing, trust, and satisfaction of a user riding the AV based on the user responses;
   determine a learned optimal policy for automated travel by the AV which increases the at least one aspect of wellbeing, trust, and satisfaction of the user based on the user responses; and
   update the travel model based on the learned optimal policy, wherein the computing device generates and executes the automated travel path based on the travel model as the travel model is updated,
   wherein the computing device is configured to process data generated from user responses and interaction between the AV and the second vehicle through a linear mixed effects model to compute a change in at least one of the wellbeing, trust, and satisfaction of the user as the at least one aspect.

2. The AV of claim 1, wherein the computing device is configured to:
   identify a dyadic bi-directional interaction featuring path symmetry between the AV and the second vehicle, wherein at least one of the AV and the second vehicle must perform a yielding action to avoid collision;
   execute one of the yielding action and an unyielding action toward the second vehicle during the interaction; and
   determine a learned optimal policy for automated travel by the AV which increases the at least one aspect of wellbeing, trust, and satisfaction of the user based on the user responses and the yielding action or unyielding action taken by the AV.

3. The AV of claim 1, wherein the computing device is configured to determine a scenario type of the interaction; and
   determine a learned optimal policy for automated travel by the AV which increases the at least one aspect of wellbeing, trust, and satisfaction of the user based on the user responses, the action taken by the AV, and the scenario type of the interaction.

4. The AV of claim 1, wherein the computing device is configured to receive user responses to automated travel by the AV associated with the interaction with the second vehicle as real-time feedback from the user, such that in a series of interactions between the AV and other vehicles including the second vehicle, the computing device updates the travel model between consecutive interactions in the series.

5. The AV of claim 1, wherein the learned optimal policy defines an action for optimal automated travel by the AV based on an initial wellbeing of the user prior to interaction with the second vehicle, wherein the action is one of a yielding action and an unyielding action with respect to the second vehicle based on the learned optimal policy.

6. The AV of claim 1, wherein the computing device is configured to determine the learned optimal policy as output of a predictive model, wherein the computing device trains the predictive model using data generated from a plurality of series of interactions between the AV and other vehicles.

7. The AV of claim 6, wherein the predictive model incorporates data indicating at least one of past experience of the user, actions by the AV toward the second vehicle, actions by the second vehicle toward the AV, a scenario type of the interaction, an initial aspect of wellbeing of the user, and user responses from the user as predictors for the at least one aspect of wellbeing, trust, and satisfaction of the user, and
   wherein the predictive model is trained to output a learned optimal policy that maximizes a likelihood of an increase in the at least one aspect of wellbeing, trust, and satisfaction of the user.

8. The AV of claim 7, comprising the user interface, wherein the AV is configured to provide survey questions to the user, and receive corresponding answers from the user through at least one of the user interface and a mobile device of the user,
   wherein the survey questions include requests to indicate at least one of previous experience with autonomous features in vehicles, prior micromobility use, and a preferred action by the AV in present and hypothetical interactions with other vehicles, and the predictive model incorporates the answers to survey questions as predictors for the at least one aspect of wellbeing, trust, and satisfaction of the user.

9. The AV of claim 6, wherein the predictive model is trained as a classification model which incorporates a plurality of classifiers to predict the at least one aspect of wellbeing, trust, and satisfaction of the user, wherein the computing device obtains a smallest feature set that maximizes area under a curve for receiver's operating characteristics to identify a best set of features for each of the incorporated classifiers.

10. The AV of claim 1, wherein the computing device is configured to retrieve past data indicating at least one of past experience, social interaction perception, and user responses associated with the user to determine the learned optimal policy prior to the interaction with the second vehicle.

11. The AV of claim 1, comprising the user interface, wherein the AV is configured to provide survey questions to user, and receive corresponding answers from the user through at least one of the user interface and a mobile device of the user, and
the computing device is configured to determine the learned optimal policy based on the user responses and the answers to survey questions.

12. The AV of claim 11, wherein the computing device is configured to determine a learned optimal policy that causes the AV to perform at least one of:
unyielding actions toward other vehicles when at least one of the user responses and the answers to survey questions indicate that an initial wellbeing of the user is low, as compared to a learned optimal policy that causes the AV to perform yielding actions toward other vehicles when at least one of the user responses and the answers to survey questions indicate that an initial wellbeing of the user is high;
unyielding actions toward other vehicles when the second vehicle was unyielding toward the AV in a most previous interaction, as compared to a learned optimal policy that causes the AV to perform yielding actions toward other vehicles when the AV was unyielding to the second vehicle in the most previous interaction, including when at least one of the user responses and the answers to survey questions indicate that the initial wellbeing of the user is high as compared to a median value; and
yielding actions toward other vehicles when the second vehicle yielded to the AV in the most previous interaction, as compared to a learned optimal policy that causes the AV to perform unyielding actions to other vehicles when at least one of the user responses and the answers to survey questions indicate that the wellbeing of the user is above a threshold value.

13. The AV of claim 11, wherein the computing device is configured to determine a learned optimal policy that causes the AV to perform at least one of:
unyielding actions toward other vehicles when at least one of the user responses and the answers to survey questions indicate that the user has high contentment with their relationship with sidewalk users and road users in the surrounding environment of the AV as compared to a median value, including when at least one of the user responses and the answers to survey questions indicate that the wellbeing of the user is high as compared to a median value; and
yielding to other vehicles when at least one of the user responses and the answers to survey questions indicate that a social interaction perception of the user is high, as compared to a learned optimal policy that is unyielding toward other vehicles when at least one of the user responses and the answers to survey questions indicate that the social interaction perception of the user is low.

14. A computer-implemented method for providing automated travel with an automated vehicle (AV), the method comprising:
generating and executing an automated travel path of the AV based on a travel model;
identifying an interaction between the AV and a second vehicle while executing the automated travel path,
receiving user responses to automated travel by the AV associated with the interaction with the second vehicle, wherein the user responses are generated by at least one of a brake mechanism, an accelerator mechanism, a steering control, and a user interface included in the AV;
determining at least one aspect of wellbeing, trust, and satisfaction of a user riding the AV based on the user responses;
determining a learned optimal policy for automated travel by the AV which increases the at least one aspect of wellbeing, trust, and satisfaction of the user based on the user responses;
updating the travel model based on the learned optimal policy, wherein a computing device of the AV generates and executes the automated travel path based on the travel model as the travel model is updated; and
processing data generated from the user responses and interaction between the AV and the second vehicle through a linear mixed effects model to compute a change in at least one of the wellbeing, trust, and satisfaction of the user as the at least one aspect.

15. The method of claim 14, further comprising:
identifying the interaction as a dyadic bi-directional interaction featuring path symmetry between the AV and the second vehicle, wherein at least one of the AV and the second vehicle must perform a yielding action to avoid collision;
executing one of the yielding action and an unyielding action toward the second vehicle during the interaction; and
determining the learned optimal policy based on the user responses and the yielding action or unyielding action taken by the AV.

16. The method of claim 14, further comprising determining a scenario type of the interaction, wherein determining the learned optimal policy includes determining the learned optimal policy based on the user responses and the scenario type of the interaction.

17. The method of claim 14, wherein determining the learned optimal policy includes determining the learned optimal policy as output of a predictive model trained using data generated from interactions between the AV and other vehicles, wherein the predictive model incorporates data indicating at least one of past experience of the user, actions by the AV toward the second vehicle, actions by the second vehicle toward the AV, a scenario type of the interaction, an initial aspect of wellbeing of the user, and user responses from the user as predictors for the at least one aspect of wellbeing, trust, and satisfaction of the user.

18. The method of claim 14, further comprising providing survey questions to the user, and receiving corresponding answers from the user through at least one of the user interface and a mobile device of the user, wherein determining the learned optimal policy includes determining the learned optimal policy based on the user responses and the answers to survey questions.

19. A non-transitory computer readable storage medium storing instructions that, when executed by a computer having a processor, causes the processor to perform a method, the method comprising:
- generating and executing an automated travel path of an automated vehicle (AV) based on a travel model;
- identifying an interaction between the AV and a second vehicle while executing the automated travel path,
- receiving user responses to automated travel by the AV associated with the interaction with the second vehicle, wherein the user responses are generated by at least one of a brake mechanism, an accelerator mechanism, a steering control, and a user interface included in the AV;
- determining at least one aspect of wellbeing, trust, and satisfaction of a user riding the AV based on the user responses;
- determining a learned optimal policy for automated travel by the AV which increases the at least one aspect of wellbeing, trust, and satisfaction of the user based on the user responses;
- updating the travel model based on the learned optimal policy, wherein a computing device of the AV generates and executes the automated travel path based on the travel model as the travel model is updated; and
- processing data generated from the user responses and interaction between the AV and the second vehicle through a linear mixed effects model to compute a change in at least one of the wellbeing, trust, and satisfaction of the user as the at least one aspect.

* * * * *